(12) United States Patent
Bian et al.

(10) Patent No.: US 12,441,809 B2
(45) Date of Patent: Oct. 14, 2025

(54) AFFINITY CHROMATOGRAPHY MEDIA FOR REMOVAL OF ANTI-A AND/OR ANTI-B ANTIBODIES

(71) Applicant: Merck Patent GmbH, Darmstadt (DE)

(72) Inventors: Nanying Bian, Lexington, MA (US); Chia-Yun Sun, Arlington, MA (US); Melissa Holstein, Concord, MA (US); Kristen Cotoni, Malden, MA (US); Matthew T. Stone, Arlington, MA (US); Santosh Rahane, Acton, MA (US)

(73) Assignee: Merck Patent GmbH, Darmstadt (DE)

( * ) Notice: Subject to any disclaimer, the term of this patent is extended or adjusted under 35 U.S.C. 154(b) by 1181 days.

(21) Appl. No.: 17/088,659

(22) Filed: Nov. 4, 2020

(65) Prior Publication Data
US 2021/0047430 A1 Feb. 18, 2021

Related U.S. Application Data

(63) Continuation of application No. 15/226,461, filed on Aug. 2, 2016, now abandoned.
(Continued)

(51) Int. Cl.
*C07K 16/34* (2006.01)
*B01D 15/20* (2006.01)
(Continued)

(52) U.S. Cl.
CPC .............. *C07K 16/34* (2013.01); *B01D 15/20* (2013.01); *B01D 15/3809* (2013.01);
(Continued)

(58) Field of Classification Search
CPC ...... C07K 16/34; C07K 1/22; C07K 2317/70; C07K 16/065; B01D 15/20;
(Continued)

(56) References Cited

U.S. PATENT DOCUMENTS

| 3,947,352 A | 3/1976 | Cuatrecasas et al. |
| 4,137,401 A | 1/1979 | Lemieux et al. |

(Continued)

FOREIGN PATENT DOCUMENTS

| CA | 2385179 A1 | 4/2001 |
| CN | 1276527 A | 12/2000 |

(Continued)

OTHER PUBLICATIONS

Anspach et al., "Purification of recombinant human basic fibroblast growth factor: stability of selective sorbents under cleaning in place conditions", Journal of Chromatography A, vol. 711, 1995, pp. 129-139.

(Continued)

*Primary Examiner* — Shafiqul Haq
(74) *Attorney, Agent, or Firm* — EMD Millipore Corporation (57) ABSTRACT

Embodiments described herein relate to novel chromatography media for removing anti-A and/or anti-B antibodies from a sample, as well as methods of using the same. The media described herein have several advantages over previously described media including, acid and alkaline stability.

7 Claims, 1 Drawing Sheet

Related U.S. Application Data (60) Provisional application No. 62/215,401, filed on Sep. 8, 2015.

(51) Int. Cl.
  *B01D 15/38* (2006.01)
  *B01D 15/42* (2006.01)
  *B01J 20/285* (2006.01)
  *B01J 20/289* (2006.01)
  *B01J 20/32* (2006.01)
  *C07K 1/22* (2006.01)

(52) U.S. Cl.
  CPC .......... *B01D 15/426* (2013.01); *B01J 20/285* (2013.01); *B01J 20/289* (2013.01); *B01J 20/321* (2013.01); *B01J 20/3274* (2013.01); *C07K 1/22* (2013.01); *B01J 2220/54* (2013.01); *B01J 2220/58* (2013.01); *C07K 2317/21* (2013.01); *C07K 2317/70* (2013.01)

(58) Field of Classification Search
  CPC .............. B01D 15/3809; B01D 15/426; B01D 15/3804; B01J 20/285; B01J 20/289; B01J 20/321; B01J 20/3274; B01J 2220/54; B01J 2220/58; B01J 20/286
  See application file for complete search history.

(56) References Cited

U.S. PATENT DOCUMENTS

| | | | |
|---|---|---|---|
| 4,195,174 | A | 3/1980 | Lemieux et al. |
| 4,362,720 | A | 12/1982 | Lemieux et al. |
| 4,404,188 | A | 9/1983 | Donahoe et al. |
| 4,664,913 | A | 5/1987 | Mielke et al. |
| 5,149,425 | A | 9/1992 | Mazid |
| 5,496,937 | A | 3/1996 | Okamoto et al. |
| 5,541,294 | A | 7/1996 | Horowitz et al. |
| 8,153,382 | B2 | 4/2012 | Chtourou et al. |
| 10,697,982 | B2 | 6/2020 | Stone et al. |
| 10,697,983 | B2 | 6/2020 | Rahane et al. |
| 2006/0073534 | A1 | 4/2006 | Kelly et al. |
| 2009/0074749 | A1 | 3/2009 | Chtourou et al. |
| 2010/0181254 | A1 | 7/2010 | Graalfs |
| 2010/0221844 | A1 | 9/2010 | Bian et al. |
| 2012/0039886 | A1 | 2/2012 | Elzaabi |
| 2013/0046056 | A1 | 2/2013 | Spector et al. |
| 2014/0166580 | A1* | 6/2014 | Rempfer ............... B01J 20/327 525/54.2 |
| 2014/0284274 | A1 | 9/2014 | Nilsson |
| 2015/0111194 | A1 | 4/2015 | Rempfer et al. |
| 2015/0133636 | A1 | 5/2015 | Xenopoulos et al. |
| 2015/0344520 | A1 | 12/2015 | Matsumoto et al. |
| 2017/0066839 | A1 | 3/2017 | Bian et al. |

FOREIGN PATENT DOCUMENTS

| | | | |
|---|---|---|---|
| CN | 101678318 | A | 3/2010 |
| CN | 103394084 | A | 11/2013 |
| CN | 104053462 | A | 9/2014 |
| EP | 0488755 | A1 | 6/1992 |
| EP | 1224462 | A2 | 7/2002 |
| EP | 1451589 | A2 | 9/2004 |
| EP | 2202310 | A2 | 6/2010 |
| EP | 2358391 | B1 | 12/2014 |
| FR | 3008097 | A1 | 1/2015 |
| FR | 3008098 | A1 | 1/2015 |
| JP | 4-203967 | A | 7/1992 |
| JP | 07-242698 | A | 9/1995 |
| JP | 2003-511468 | A | 3/2003 |
| JP | 2009-521520 | A | 6/2009 |
| JP | 2010-528271 | A | 8/2010 |
| JP | 2012-229212 | A | 11/2012 |
| JP | 2012-254981 | A | 12/2012 |
| JP | 2013-151507 | A | 8/2013 |
| JP | 2014-531966 | A | 12/2014 |
| KR | 10-1207797 | B1 | 11/2012 |
| WO | 2001/27623 | A2 | 4/2001 |
| WO | 2003/043403 | A2 | 5/2003 |
| WO | 2007/077365 | A2 | 7/2007 |
| WO | 2009/154375 | A2 | 12/2009 |
| WO | 2010/076496 | A1 | 7/2010 |
| WO | 2013/062479 | A1 | 5/2013 |
| WO | 2013/066251 | A1 | 5/2013 |
| WO | 2014/004281 | A1 | 1/2014 |
| WO | 2015/001277 | A1 | 1/2015 |
| WO | 2015/034566 | A1 | 3/2015 |
| WO | 2015/049651 | A1 | 4/2015 |
| WO | 2016/177966 | A1 | 11/2016 |

OTHER PUBLICATIONS

EMD Millipore, "The Highest Dynamic Binding Capacity Protein A Affinity Chromatography Media, Designed for Cost Effective, Large-Scale Purification of Today's Higher Titer Therapeutic Antibodies", ProSep Ultra Plus Chromatography Media, 2014, 8 pages.

Fiddler et al., "Immobilization of Proteins on Aldehyde-Activated Polyacrylamide Supports", Analytical Biochemistry, vol. 86, 1978, pp. 716-724.

Hellberg et al., "Chemical and Functional Stability of a New Protein A Media with High Dynamic Binding Capacity Based on Novel, Highly Rigid Agarose Beads", Amersham Biosciences, 2000, 4 pages.

ISOSEP, "Specialists in Carbohydrates and Glycoconjugates—Catalog 2002/2003", 2002, 3 pages.

Ivanov et al., "Favourable biospecific reactivity of blood group B antigenic trisaccharide chemically attached to Poly-N-(2-hydroxyethyl)acrylamide-coated porous glass", Biomedical Chromatography, vol. 6, 1992, pp. 39-42.

Ivanov et al., "Inorganic Supports Coated with N-Substituted Polyacrylamides: Application to Biospecific Chromatography of Proteins", Biomedical Chromatography, vol. 5, 1991, pp. 90-93.

Kanamori et al., "Preparation of High-Capacity Affinity Adsorbents Using Formyl Carriers And Their Use For Lowand High-Performance Liquid Affinity Chromatography of Trypsin-Family Proteases", Journal of Chromatrography, vol. 363, 1986, pp. 231-242.

Matsumoto et al., "Derivatization of Epoxy-Activated Agarose with Various Carbohydrates for the Preparation of Stable and High-Capacity Affinity Adsorbents: Their Use for Affinity Chromatography of Carbohydrate-Binding Proteins", Analytical Biochemistry, vol. 116, 1981, pp. 103-110.

Mazid et al., "An Improved Affinity Support and Immunoadsorbent with a Synthetic Blood Group Oligosaccharide and Polymer Coating for Hemoperfusion", Journal of Applied Biomaterials, vol. 3, 1992, pp. 9-15.

Mazid et al., "Immunoadsorbents with synthetic oligosaccharide hapten representing blood group A substances", Bioconjugate Chem., vol. 2, 1991, pp. 32-37.

Millipore Sigma, "Biochromatography Portfolio Guide", Bulk Resin, Membranes and Prepacked Columns 2019, 8 pages.

Osterwalder et al., "Immunoadsorption for Removal of Anti-A and Anti-B Blood Group Antibodies in ABO-Incompatible Bone Marrow Transplantation", Blut, vol. 53, 1986, pp. 379-390.

Pritchard et al., "Murine Monoclonal Antibodies to Type Ib Polysaccharide of Group B Streptococci Bind to Human Milk Oligosaccharides", Infection and Immunity, vol. 60, No. 4, Apr. 1992, pp. 1598-1602.

Strategies To Address Hemolytic Complications of Immune Globulin Infusions, FDA Centre For Biologics Evaluation and Research Center for Drug Evaluation and Research, Workshop on Risk Mitigation Measure Strategies, Jan. 28, 2014, 348 pages.

Extended European Search Report received for European Patent Application No. 16187836.8, mailed on Feb. 1, 2017, 10 pages.

Extended European Search Report received for European Patent Application No. 16187837.6, mailed on Feb. 1, 2017, 9 pages.

(56) References Cited

OTHER PUBLICATIONS

Extended European Search Report received for European Patent Application No. 16187838.4, mailed on Jan. 31, 2017, 8 pages.
Alikhani et al., "High Molecular Weight Blood Group A Trisaccharide-Polyacrylamide Glycoconjugates as Synthetic Blood Group A Antigens for Anti-A Antibody Removal Devices", Journal of Biomedical Materials Research Part B: Applied Biomaterials, vol. 91, 2009, pp. 845-854.
Tu et al., "Preparation and characterization of novel IgG affinity resin coupling anti-Fc camelid single-domain antibodies", Journal Of Chromatography B: Biomedical Sciences & Applications, vol. 983-984, Mar. 1, 2015, pp. 26-31.
Bensinger et al., "Immunoadsorption for removal of A and B blood-group antibodies", New England Journal of Medicine, vol. 304, Issue 3, Jan. 15, 1981, pp. 160-162.
Bensinger et al., "In Vitro and In Vivo Removal of Anti-A Erythrocyte Antibody by Adsorption to a Synthetic Immunoadsorbent", Transfusion, vol. 21, Issue 3, May-Jun. 1981, pp. 335-342.
Bensinger et al., "Whole Blood Immunoadsorption of Anti-A or Anti-B Antibodies", Vox Sanguinis, vol. 48, Issue 6, Jun. 1985, pp. 357-361.
Blomberg et al., "Improved Removal of Anti-A and Anti-B Antibodies from Plasma Using Blood-Group-Active Haptens", Vox Sanguinis, vol. 65, Issue 2, Jul. 1993, pp. 126-135.
Christensson et al., "Flow cytometric quantitation of serum anti-D in pregnancy", Transfusion, vol. 36, Issue 6, 1996, pp. 500-505.
Crawford et al., "Practical application of synthetic A and B blood group immunoadsorbents", Blood Transfusion and Immunohaematology, vol. 24, Issue 3, 1981, pp. 281-287.
Dhainaut et al., "In vitro and in vivo properties differ among liquid intravenous immunoglobulin preparations", Vox Sanguinis, vol. 104, Issue 2, Feb. 2013, pp. 115-126.
Thorpe et al., "International collaborative study to evaluate candidate reference reagents to standardize haemagglutination testing for anti-A and anti-B in normal intravenous immunoglobulin products", Vox Sanguinis, vol. 97, 2009, pp. 160-168.
Solovan et al., "Synthetic blood group antigens for anti-A removal device and their interaction with monoclonal anti-A IgM", Transplant Immunology, 2006, pp. 245-249.
Gautam et al., "Monoclonal Anti-A Antibody Removal by Synthetic A Antigen Immobilized on Specific Antibody Filters", Biotechnology and Bioengineering, vol. 99, No. 4, Mar. 1, 2008, pp. 876-883.
Gray Gary, "Affinity Chromatography", Analytical Chemistry, 1980, pp. 9-15.
Sharon et al., "Lectins", Second Edition, Springer Publications, 2007, 4 pages.
Rydberg et al., "In vitro assessment of a new ABO immunosorbent with synthetic carbohydrates attached to sepharose", Transplant International, vol. 17, Issue 11, Jan. 2005, pp. 666-672.

Rydberg et al., "Characterisation of the anti-A antibody response following an ABO incompatible (A2 to O) kidney transplantation", Molecular Immunology, vol. 29, Issue 4, Apr. 1992, pp. 547-560.
Rogers et al., "Development of A Rapid Sanitization Solution For Silica-Based Protein A Affinity Adsorbents", Journal of Chromatography A, vol. 1216, Issue 21, May 22, 2009, pp. 4589-4596.
Rieben et al., "In vitro evaluation of the efficacy and biocompatibility of new, synthetic ABO immunoabsorbents", Transplantation, vol. 60, Issue 5, Sep. 15, 1995, pp. 425-430.
Lemieux R.U., "Human blood groups and carbohydrate chemistry", Haworth Memorial Lecture, Chemical Society Reviews, 1978, vol. 7, pp. 423-452.
Lockyer et al., "Absorption of Unwanted Anti-A-B Agglutinins from Anti-Rh D Grouping Sera Using Time-Expired Formalised Heat-Treated A1 B Rh D Positive Red Cells", Vox Sanguinis, vol. 12, Issue 1, Jan. 1967, pp. 75-77.
Matsui et al., "Comparative study of blood group-recognizing lectins toward ABO blood group antigens on heoglycoproteins, glycoproteins and complex-type oligosaccharides", Biochimica et Biophysica Acta (BBA), vol. 1525, Issues 1-2, 2001, pp. 50-57.
Oyen et al., "Use of *Escherichia coli* 086: B7 in the Adsorption of Anti-A and Anti-B from Blood Typing Sera", Transfusion, vol. 12, Issue 2, Mar. 4, 1972, pp. 98-102.
Müller-Schulte et al., "Comparative Affinity Chromatographic Studies Using Novel Grafted Polyamide And Poly (Vinyl Alcohol) Media", Journal of Chromatography A, vol. 539, Issue 2, 1991, pp. 307-314.
Mcdonald et al., "A New Monoclonal Anti-A Antibody BIRMA-1: A Potent Culture Supernatant Which Agglutinates Ax Cells, but Does Not Give Undesirable Reactions with B Cells", Vox Sanguinis, vol. 61, 1991, pp. 53-58.
Non Final Office Action Received for U.S. Appl. No. 15/226,419, mailing date Apr. 18, 2019, 5 Pages.
Non Final Office Action Received for U.S. Appl. No. 15/226,419, mailing date Aug. 24, 2018, 9 Pages.
Non Final Office Action Received for U.S. Appl. No. 15/226,441, mailing date Apr. 18, 2019, 5 Pages.
Non Final Office Action Received for U.S. Appl. No. 15/226,441, mailing date Aug. 24, 2018, 9 Pages.
Final Office Action Received for U.S. Appl. No. 15/226,461, mailing date Apr. 1, 2019, 10 Pages.
Final Office Action Received for U.S. Appl. No. 15/226,461, mailing date Aug. 13, 2020, 13 Pages.
Non Final Office Action Received for U.S. Appl. No. 15/226,461, mailing date Aug. 5, 2019, 11 Pages.
Non Final Office Action Received for U.S. Appl. No. 15/226,461, mailing date Dec. 19, 2018, 9 Pages.

\* cited by examiner

AFFINITY CHROMATOGRAPHY MEDIA FOR REMOVAL OF ANTI-A AND/OR ANTI-B ANTIBODIES

CROSS-REFERENCED TO RELATED APPLICATIONS

The application is a continuation application of U.S. patent application Ser. No. 15/226,461, filed Aug. 2, 2016, which claims the benefit of priority of U.S. Provisional Patent Application No. 62/215,401, filed Sep. 8, 2015, each of which is incorporated by reference herein in its entirety.

BACKGROUND

Human plasma enriched in immunoglobulins is used for the treatment of many disorders as well as to treat certain congenital deficiencies. Typically, human plasma is obtained by pooling the plasma from multiple donors, having different blood group types. Blood group types may be divided into 4 major types. Blood group type A—having only the A antigen on red cells (and B antibody in the plasma); blood group type B—having only the B antigen on red cells (and A antibody in the plasma); blood group type AB—having both A and B antigens on red cells (but neither A nor B antibody in the plasma); and blood group type O—having neither A nor B antigens on red cells (but both A and B antibodies are in the plasma).

It is important that the red bloods cells of a person having a particular blood group type antigen, such as A, never come in contact with the antibodies that will bind to this antigen, such as anti-A antigen antibodies, because contact with such antibodies would result in agglutination and/or hemolysis of their red blood cells that can even result in death. Therefore, a recipient having blood group type A may only receive plasma from a donor having blood group type A or blood group type AB; a recipient having blood group type B may only receive plasma from a donor having blood group type B or blood group type AB; a recipient having blood group AB may only receive plasma from a donor having blood group type AB; and a recipient having blood group type O is deemed a universal recipient. Compatibility of the different blood group types is important for the development of safe blood transfusions and organ transplants. However, in case of blood derived therapeutic drugs that rely on pooling of blood plasma from a large numbers of people to obtain a consistent average of protein components, it becomes particularly challenging to ensure that a recipient does not receive non-compatible plasma.

A number of approaches have been developed to selectively remove blood group type antibodies from plasma, including formalinized heat-treated red cells (Vox Sang., 1967, 12, 75-77), heat treated *Escherichia coli* 086:B7 having A and B antigens (Transfusion, 1972, 12, 98-102), red cell stroma powder, red cell stroma antigen derived immunoadsorbents (Chemical Soc. Rev., 1978, 7, 423-452), and synthetic blood group A and B immunoadsorbents (Rev. Fr. Transfus. Immunohematol. 1981, 24, 3, 281-287).

Solid phase chromatography immunoadsorbents have been developed as commercial chromatography media for the treatment of blood derived products and also for the preparation of donors before transplantation to an ABO incompatible recipient. One of the key advantages of employing synthetic immunoadsorbents is that they are synthetically constructed instead of being derived from natural sources and therefore have more consistent properties from batch to batch.

Currently, some of the commercially available chromatographic media with blood group A antigen (A-antigen) ligands and/or blood group B antigen (B-antigen) ligands include the Glycosorb-ABO device (Glycorex Transplantation AB). This Glycosorb device is used to prepare organ donors for transplantation to patients having incompatible blood types. The blood group antigen ligands in the Glycosorb-ABO device bind and remove the blood group A antigen antibodies (anti-A) and blood group B antigen antibodies (anti-B) from the blood of organ donors thus reducing the risk of organ rejection.

Further, PCT Publication No. WO2015/001277 discusses affinity chromatography matrices which bind anti-A or anti-B antibodies.

SUMMARY

Embodiments described herein relate to novel chromatography media for removal of anti-A or anti-B antibodies from a sample (e.g., blood, blood products, plasma, plasma derivatives or IVIG).

The chromatography media described herein have several advantages over the previously described chromatography media for removal of anti-A or anti-B antibodies, in that the media are stable under both acid and/or alkaline conditions over an extended period of time. Further, such media can be sanitized using a solution comprising phosphoric acid, acetic acid and benzyl alcohol, without losing its ability to remove anti-A or anti-B antibodies.

In some embodiments described herein, a chromatography media for removing anti-A antibodies from a sample is provided, where the chromatography media comprises a solid support with a blood group A antigen ligand attached thereto, where the ligand is attached to the solid support at a ligand loading of at least 0.8 mg/ml of solid support, where the chromatography media is stable under acid and alkaline conditions. In a particular embodiment, the ligand loading is at least 1 mg/ml of solid support or at least 1.5 mg/ml of solid support or at least 1.65 mg/ml of solid support and where the chromatography media is stable under acid and alkaline conditions.

In another embodiment, a chromatography media for removing anti-B antibodies from a sample is provided, where the chromatography media comprises a solid support with a blood group B antigen ligand attached thereto, where the ligand is attached to the solid support at a ligand loading of at least 0.8 mg/ml of solid support, where the chromatography media is stable under acid and/or alkaline conditions. In a particular embodiment, the ligand loading is at least 1.0 mg/ml of solid support or at least 1.20 mg/ml of solid support and where the chromatography media is stable under acid and alkaline conditions.

In yet another embodiment, a chromatography media for removing both anti-A and anti-B antibodies from a sample is provided, where the chromatography media comprises a solid support with both blood group A antigen and blood group B antigen ligands attached thereto, each at a ligand loading of at least 0.8 mg/ml of solid support.

In various embodiments described herein, the solid support comprises a polymer selected from the group consisting of polyvinylether, polyvinylalcohol, polymethacrylate, polyacrylate, polystyrene, polyacrylamide, polymethacrylamide and polycarbonate. In a particular embodiment, the solid support is a polyvinylether based solid support. In some embodiments, the solid support is in bead form.

In some embodiments, the blood group A antigen ligand comprises the following structure:

In some embodiments, the blood group B antigen ligand comprises the following structure:

In some embodiments described herein, the chromatography media comprise a blood group A antigen ligand and/or a blood group B antigen ligand attached to a solid support using reductive amination chemistry.

In other embodiments described herein, the chromatography media comprise a blood group A antigen ligand and/or a blood group B antigen ligand attached to a solid support using polymer tentacle chemistry.

In some embodiments, the chromatography media is packed in a device, e.g., a chromatography column.

In addition to chromatography media, embodiments described herein also relate to methods of removing anti-A and/or anti-B antibodies from a sample (e.g., blood, blood products, plasma, plasma derivatives or an IVIG feed) using the chromatography media described herein.

In some embodiments, a method of removing anti-A antibodies or anti-B antibodies from a sample is provided, where the method comprises the steps of: providing a sample comprising a starting known amount of anti-A antibodies or anti-B antibodies; contacting the sample with the blood group A antigen ligand containing chromatography media if the sample contains anti-A antibodies or blood group B antigen ligand containing chromatography media if the sample contains anti-B antibodies, under suitable conditions for media to bind the antibodies; recovering that portion of the sample which is not bound to the chromatography media; and measuring amount of anti-A antibodies or anti-B antibodies in the portion of sample not bound to the chromatography media, wherein the amount of anti-A antibodies or anti-B antibodies in the portion of the sample not bound to the chromatography media is reduced by at least 50% relative to the starting known amount of anti-A or anti-B antibodies in the sample.

Embodiments described herein also relate to methods of removing both anti-A and anti-B antibodies from a sample containing both. In some embodiments, methods described herein employ sequential use of the chromatography media described herein. In other words, a sample is first contacted with a blood group A antigen ligand containing chromatography media described herein followed by a blood group B antigen ligand containing chromatography media described herein; or alternatively, the sample is contacted first with a blood group B antigen ligand containing chromatography media described herein followed by a blood group A antigen ligand containing media described herein. In other embodiments, a sample is contacted with a mixture of both media, wherein the mixture removes both anti-A and anti-B antibodies in a single step. In yet other embodiments, methods described herein relate to the use of a chromatography media which includes both blood group A antigen and blood group B antigen ligands attached to the same solid support at ligand loadings of at least 0.8 mg/ml.

Also described herein are methods of sanitizing a chromatography column containing a chromatography media described herein after use, where the method comprises contacting the column with a solution comprising phosphoric acid, acetic acid and benzyl alcohol (PAB) for at least three hours, and where the chromatography media comprises a blood group A antigen ligand and/or blood group B antigen ligand immobilized onto a solid support, and further where the chromatography media maintains its ability to remove anti-A and/or anti-B antibodies following exposure to PAB.

Additionally, the embodiments described herein relate to methods of cleaning a chromatography column containing a chromatography media described herein, using an acid or an alkaline solution. In some embodiments, a method of cleaning a chromatography column comprising a media containing blood group A antigen ligand and/or blood group B antigen ligand immobilized onto a solid support is provided, where the method employs contacting the chromatography column containing the chromatography media with an acid or alkaline solution between purification cycles, where the chromatography media maintains its ability to remove anti-A or anti-B antibodies even following prolonged exposure to acid or alkaline solution (e.g., 50 hours or more). In some embodiments, the media maintains its ability to remove anti-A or anti-B antibodies after 2 purification cycles, or after 5 purification cycles, or after 10 purification cycles, or after 15 purification cycles, or after 20 purification cycles, or after 25 purification cycles, or after 30 purification cycles, or after 35 purification cycles, or after 40 purification cycles, or after 45 purification cycles, or after 50 purification cycles or more than 50 purification cycles, or even more than 100 purification cycles, where the chromatography column is cleaned using acid or alkaline solution between purification cycles and a typical cycle may consist of 30 minutes of exposure to the cleaning agent.

The media described herein can also be used for the purification of monoclonal anti-A IgM or monoclonal anti-B antibody from a clarified cell culture feed.

In some embodiments, a method of purifying a monoclonal anti-A IgM antibody from a clarified cell culture feed is provided, where the method comprises the steps of: (a) providing a clarified cell culture feed containing a monoclonal anti-A IgM antibody; (b) incubating the feed with the media having a blood group A antigen ligand attached to a solid support at a ligand loading of at least 0.8 mg/ml, to facilitate the binding of anti-A IgM antibody to the media; (c) washing the media with an aqueous buffer having a pH ranging from 3.5 to 9.0; (d) eluting the anti-A IgM antibody from the media using a buffer having a pH ranging from 2.0 to 3.0, thereby to obtain an eluate; and (e) recovering the purified anti-A IgM antibody in the eluate.

In other embodiments, a method of purifying a monoclonal anti-B IgM antibody from a clarified cell culture feed is provided, where the method comprises the steps of: (a) providing a clarified cell culture feed containing a monoclonal anti-B IgM antibody; (b) incubating the feed with the media having a blood group B antigen ligand attached to a solid support at a ligand loading of at least 0.8 mg/ml, to facilitate the binding of anti-B IgM antibody to the media; (c) washing the media with an aqueous buffer having a pH ranging from 3.5 to 9.0; (d) eluting the anti-B IgM antibody from the media using a buffer having a pH ranging from 2.0 to 3.0, thereby to obtain an eluate; and (e) recovering the purified anti-B IgM antibody in the eluate.

In some embodiments, the media is packed in a chromatography column and a clarified cell culture feed containing an anti-A IgM monoclonal antibody or an anti-B IgM antibody is flowed through the column.

DETAILED DESCRIPTION

Recently there has been an increased interest in the application of synthetic immunoadsorbent chromatography media for the removal of anti-A and anti-B IgG antibodies from intravenous immunoglobulin (IVIG), which consists of concentrated polyvalent IgG antibodies extracted from pooled plasma obtained from several blood donors, sometimes as many as thousand or greater than thousand blood donors. However, most commercially available chromatography media are limited by the operating conditions under which they may be used.

Embodiments described herein relate to novel chromatography media for removing anti-A or anti-B antibodies from a sample.

The chromatography media described herein have several advantages over previously described chromatography media. For example, the chromatography media are useful for large-scale operations, where the media can be readily eluted and cleaned in place multiple times under a wide range of pH conditions, without losing its capability to remove anti-A or anti-B antibodies from a sample (e.g., blood, blood products, plasma, plasma derivatives or IVIG feed).

Furthermore, the loading conditions used with the chromatography media described herein can span a pH range of 3.5 to 9 and the elution conditions can span a pH ranging from 2 to 4. Because the chromatography media described herein can be used, cleaned-in-place and sanitized under a wide range of pH conditions, they give an operator a great deal of flexibility in the operating conditions to use with the media.

The chromatography media described herein can be sanitized using phosphoric acid-acetic acid-benzyl alcohol (PAB) buffer, which has not been previously described to clean-in-place a media useful for removing anti-A and anti-B antibodies. As evidenced by Examples herein, the chromatography media described herein was found to maintain its performance even after a 150 hours of exposure to PAB.

The present invention is based, at least on the surprising and unexpected discovery that, a chromatography media useful for removing anti-A or anti-B antibodies from a sample can be cleaned with both acid and alkaline solutions.

In order that the embodiments disclosed herein may be more readily understood, certain terms are first defined. Additional definitions are set forth throughout the detailed description.

I. Definitions

The term "binding capacity" refers to the amount of a molecule which binds to a defined volume of media packed in a column which is then run under suitable conditions. The binding capacity for any media is highly dependent on the underlying conditions. In general, the lower the sample flow rate, the higher the binding capacity. As the flow rate approaches zero, the binding capacity approaches the maximum available capacity. The binding capacity of a chromatography media described herein is based on the amount of anti-A or anti-B antibodies, the chromatography media can bind per volume of media at a set flow rate.

Without proper cleaning and sanitization, the binding capacity of a chromatography media, including an affinity chromatography media, typically drops below the initial value. Further, chromatography media generally tend to lose binding capacity following exposure to acid or alkaline solutions. When the binding capacity is lower than a desired value, a significant amount of the molecule meant to be bound by the media can "breakthrough," or co-elute with the flow through fraction, which is largely undesirable. The embodiments described herein provide affinity chromatography media for removing anti-A and/or anti-B antibodies from a sample (e.g., blood, blood products, plasma, plasma derivatives and IVIG feed), which maintain their binding capacity even after cleaning under acid or alkaline conditions or sanitization using PAB.

The term "static binding capacity" is defined as the mass of protein adsorbed (e.g., anti-A and/or anti-B antibodies in this case) by a chromatography media (e.g., the affinity chromatography media described herein) divided by the volume of the chromatography media used. An exemplary method for measuring the static binding capacity of a chromatography media is as follows. After contacting the chromatography media with the protein solution of known concentration, the solution is allowed to incubate with the chromatography media to facilitate binding of the protein (e.g., anti-A and/or anti-B antibodies in this case) to the chromatography media. The incubation time may vary (e.g., from 5 minutes to 72 hours) and can be readily determined by one of ordinary skill in the art, e.g., by measuring the concentration of the protein in the supernatant periodically (e.g., by measuring absorbance at 280 nm) until there is no measurable change in the concentration in the supernatant. Once equilibrium is reached between the protein bound to the chromatography media and that in solution, the concentration of the protein solution is once again measured in the supernatant. The static binding capacity is then measured by the starting amount of protein (before incubation) minus the amount of protein in the supernatant (after incubation) divided by the volume of the chromatography media used.

The static binding capacity of a particular chromatography media is generally influenced by the composition of the protein solution including one or more of the following factors, e.g., concentration of the protein, amount of chromatographic media used, concentration of other components in the solution (salts, organic molecules, buffers), the solution pH, and conductivity. It may also be influenced by the temperature of the protein solution. All of these variables are generally held constant in order to allow the comparison of static binding capacity between two different chromatography media. The term "static binding capacity" may also be referred to as "saturation binding capacity" or "maximum binding capacity."

The supernatant of a sample contacted with a chromatography media may be obtained by allowing the chromatography media in a slurry to settle to the bottom of a container or a column. The settling process can be accelerated by subjecting the slurry of chromatography media to centrifugation or by vibration. The supernatant solution can then be separated from the chromatography media by transferring via a pipetting, syringe, or pump to a separate container. In some embodiments, the supernatant is obtained by filtering a slurry of a chromatography media through a membrane or a porous material, following incubation with a sample.

The term "dynamic binding capacity" is defined as the amount of a protein (e.g., anti-A and/or anti-B antibodies in this case) that is bound by a chromatography column containing a chromatography media described herein under flow conditions at the point when the concentration of the protein solution exiting the chromatography column reaches a certain concentration, typically a predetermined percentage of the starting concentration. In practice, this tends to be about 10% of the starting concentration. This mass of protein is then divided by the volume of chromatography media in the chromatograph column.

The dynamic binding capacity of a chromatography media is generally influenced by the composition of the protein solution used including one or more of the following factors, e.g., concentration of the protein, concentration of other components in the solution (salts, organic molecules, buffers), the solution pH, and conductivity. The dynamic binding capacity may also be influenced by the temperature at which the column is loaded and by the flow-rate at which the protein solution is loaded onto the column. Decreasing the flow-rate of the protein solution into the chromatography column increases the dynamic binding capacity that is measured. Conversely, increasing the flow-rate of the protein solution into the chromatography column decreases the dynamic binding capacity that is measured. The dynamic binding capacity should not exceed the static binding capacity since the dynamic capacity of a chromatography media is limited by the overall rate of mass transfer.

The term "sample" is defined as the solution containing at least one target protein (e.g., anti-A and/or anti-B antibodies in this case) intended to be bound to a chromatography media described herein. In some embodiments, the target protein is an antibody or an immunoglobulin. In some embodiments, the immunoglobulin is a blood group A antigen antibody (i.e., anti-A antibody). In other embodiments, the immunoglobulin is a blood group B antigen antibody (i.e., anti-B antibody). Examples of samples include but are not limited to, blood, plasma, plasma derivatives, blood products, intravenous immunoglobulins feed (IVIG or IVIG feed).

The term "remove," "removal" or "removed," as used herein, refers to a substantial reduction in the amount of anti-A or anti-B antibodies present in a sample, following contacting the sample with a chromatography media described herein. In some embodiments, the amount of anti-A or anti-B antibodies is reduced by at least 50%, or at least 70%, or at least 80%, or at least 90%, or at least 95%, or greater than 95% compared to the starting amount. The amount of the anti-A and/or anti-B antibodies before and after contacting with a chromatography media described herein can be measured using one or more methods known in the art and those described herein. For example, amounts of anti-A or anti-B antibodies in a sample before and after incubation with a chromatography media described herein can be measured using agglutination assays, e.g., direct coombs test (DCT) and indirect coombs test (ICT) as described in European Pharmacopoeia (2.6.20). However, both DCT and ICT have high variability and are difficult to standardize (Thorpe S J et al., Vox Sanguinis 2009, 97, 160-168).

As described herein, flow cytometry is used for measuring the amount of anti-A or anti-B antibodies removed from a sample (e.g., an IVIG feed) following purification with a chromatography media described herein. Flow Cytometry method using red blood cells to capture blood-typing antibodies is well documented in the literature (Christensson et al., Transfusion 1996; 36:50-505, Dhainaut et al., 2013; 104:115-126). As described herein, IVIG samples are incubated with either type A or type B red blood cells for a determined time, washed extensively, and stained with fluorescently labeled secondary antibodies (F(ab')2 Goat anti-Human IgG H+L, Jackson ImmunoResearch). Samples are diluted to a concentration optimal for flow cytometry measurement. Mean fluorescent intensity (MFI) of the samples is evaluated by a flow cytometer (Guava 5HT, EMD Millipore). Net MFI is used to compare anti-A or anti-B in a sample (e.g., an IVIG feed) before and after contacting with a blood group A antigen ligand or blood group B antigen ligand containing chromatography media described herein, and also with and without exposure to acid or alkaline conditions. Percentage removal of anti-A or anti-B antibodies is calculated by comparing anti-A or anti-B antibody level in flow through (or supernatant) to anti-A or anti-B antibody level in the sample The term "acid stability" is defined as the ability of a chromatographic media to remove substantial percentage of an impurity (e.g., greater than 50% or greater than 60% or greater than 70% or greater than 80% or greater than 90% or higher removal of anti-A and/or anti-B antibodies) from a sample even after a 50 hour exposure to a solution having a low pH, typically below pH 4. Chromatographic media that are acid stable can be eluted, cleaned and/or sanitized under acidic conditions. Those chromatographic media that are not acid stable generally exhibit a reduced ability to remove a substantial percentage of impurities (i.e., anti-A and/or anti-B antibodies in this case) after exposure to acidic conditions.

Chromatography media are commonly eluted and cleaned using acid solutions. For example, 0.15 M phosphoric acid or 0.3% v/v hydrochloric acid are commonly used cleaning agents. Exemplary elution solutions include, e.g., 0.1 M glycine, pH 2.0; 0.1 M glycine, pH 2.2; 0.1 M glycine, pH 2.5; 0.1 M glycine, pH 2.7; and 0.1 M glycine, pH 3.0. However, many commercially available media tend to lose their ability to remove impurities from a sample after exposure to such conditions. The chromatography media described herein maintain their ability to remove anti-A and anti-B antibodies from a sample even after prolonged exposure (i.e., even after 50 hours or longer) to acidic conditions, i.e., they are acid stable. The acid stability of chromatography media described herein can be evaluated by exposing the media to an acid solution for a specified period of time and then evaluating its performance relative to a control which has not been exposed to the acid solution. The evaluation of media performance can include measurements of binding capacity, resolution of desired and undesired species, removal of impurities, or combinations thereof.

The term "alkaline stability" is defined as the ability of the chromatographic media to maintain its ability to remove a substantial percentage of an impurity (e.g., greater than 50% or greater than 60% or greater than 70% or greater than 80% or greater than 90% or higher removal of anti-A and/or anti-B antibodies) from a sample, even after a 50 hour exposure to a solution having a high pH, typically above pH 9. Chromatographic media that are alkaline stable can be eluted, cleaned and/or sanitized under basic conditions. Those chromatographic media that are not alkaline stable generally exhibit a reduced ability to remove a substantial percentage of impurities (i.e., anti-A and/or anti-B antibodies in this case) after extended exposure to alkaline conditions.

Chromatography media are commonly sanitized using alkaline solutions (e.g., 0.1 M or 0.5 M sodium hydroxide). However, most commercially available chromatography media tend to lose their ability to remove impurities from a sample following exposure to such conditions. The chromatography media described herein maintain their ability to remove anti-A and anti-B antibodies from a sample or the ability to remove substantial amount of anti-A or anti-B antibodies (e.g., at least 50% or at least 60% or at least 70% or at least 80% or more) from a sample, even after prolonged exposure (e.g., about 50 hours or longer) to alkaline conditions, i.e., they are alkaline stable. The alkaline stability of media can be evaluated by exposing the media to an alkaline solution for a specified period of time and then evaluating its performance (e.g., binding capacity or ability to remove a substantial amount of anti-A or anti-B antibodies) relative to a control which has not been exposed to alkaline solution. The evaluation of media performance can include measurements of binding capacity, resolution of desired and undesired species, removal of impurities, or combinations thereof.

In some embodiments, alkaline or acid stability refers to the ability of a chromatography media described herein to retain at least 65%, or at least 70%, or at least 75%, or at least 80%, or at least 85%, or at least 90%, or at least 95% of its initial binding capacity after 5 hours, or after 10 hours, or after 15 hours, or after 20 hours, or after 25 hours, or after 30 hours, or after 40 hours, or after 50 hours, or after 60 hours, or after 70 hours, or after 80 hours, or after 90 hours, or after 100 hours of exposure of an alkaline or an acid solution, respectively. In another embodiment, alkaline or acid stability refers to a decrease in the initial binding capacity of the ligand by less than 70%, or less than 60%, or less than 50%, or less than 40%, or less than 30% even after 5 hours or 10 hours or 15 hours or 20 hours or 25 hours or 30 hours or 40 hours or 50 hours or 60 hours or 70 hours or 80 hours or 90 hours or 100 hours or longer exposure to an alkaline or acid solution, respectively.

The term "initial binding capacity," as used herein, refers to the amount of anti-A or anti-B antibodies that can be captured by a unit volume of a chromatography media described herein, prior to exposure of the media to acid or alkaline conditions.

In some embodiments, chromatography media described herein are able to withstand acid or alkaline cleaning and/or sanitizing for a prolonged period of time, which renders the chromatography media attractive candidates, especially for cost-effective removal of anti-A and/or anti-B antibodies from a sample (e.g., blood, blood products, plasma, plasma derivatives or an IVIG feed).

The term "ligand loading," as used herein, refers to the amount of ligand used per unit volume of the solid support during the coupling reaction to immobilize the ligand onto the solid support. Ligand loading is measured in mg/ml or gm/liter of the settled volume of solid support. In some embodiments, the ligand loading is at least 0.8 mg/ml or at least 1 mg/ml or at least 1.1 mg/ml or at least 1.2 mg/ml or at least at least 1.5 mg/ml or 1.65 mg/ml or higher. In a particular embodiment, the ligand loading is at least 1.65 mg/ml, in case of a blood group A antigen ligand or at least 1.2 mg/ml, in case of a blood group B antigen ligand. The settled volume of solid support can be determined by allowing the solid support to settle by gravity in a slurry containing the storage buffer or water for a fixed number of hours.

The term "media" or "chromatography media," as used interchangeably herein, refers to a solid support having a blood group A antigen ligand and/or blood group B antigen ligand immobilized thereon, at a ligand loading of at least 0.8 mg/ml of solid support. In some embodiments, a linker is used for immobilization, which may be part of the ligand itself or a separate entity.

The term "linker" is defined as species that chemically connects a blood group oligosaccharide antigen ligand to the functional group that is used for immobilization onto a solid support. Non-limiting examples of such linkers include $(CH_2)_n$, $(CH_2)_m$—O—$(CH_2)_n$, $(CH_2CH_2O)_n$, $(CH_2)_m$—CONH, $(CH_2)_m$—NR—$(CH_2)_n$, $(CH_2)_m$—NH—CO—NH—$(CH_2)_n$, $(CH_2)_m$—NH—$(CH_2)_n$, and $(CH_2)_m$—CONH—$(CH_2)_n$, $(CH_2)_m$—COS, $(CH_2)_m$—S—$(CH_2)_n$, $(CH_2)_m$—S—CO—S—$(CH_2)_n$, and $(CH_2)_m$—COS—$(CH_2)_n$ where m and n could range from 1-22.

The term "chromatography," as used herein, refers to a dynamic separation technique which separates or removes a molecule (e.g., anti-A and/or anti-B antibodies in this case) from other molecules in a sample. Typically, in a chromatography method, a mobile phase (liquid or gas) transports a sample containing the molecule to be separated or removed through a stationary phase (normally solid) medium (e.g., a chromatography media). Differences in partition or affinity to the stationary phase separate the molecule from other components of the sample.

The term "affinity chromatography," as used herein, refers to a mode of chromatography where a molecule to be separated or removed (e.g., anti-A and/or anti-B antibodies) is isolated by its interaction with another molecule (e.g., a blood group A antigen ligand or blood group B antigen ligand immobilized onto a solid support) which specifically interacts with the molecule to be separated or removed.

The term "IgG," "immunoglobulin," "Ig" or "antibody" (used interchangeably herein) refers to a protein having a basic four-polypeptide chain structure consisting of two heavy and two light chains, said chains being stabilized, for example, by interchain disulfide bonds, which has the ability to specifically bind antigen. The term "single-chain immunoglobulin" or "single-chain antibody" (used interchangeably herein) refers to a protein having a two-polypeptide chain structure consisting of a heavy and a light chain, said chains being stabilized, for example, by interchain peptide linkers, which has the ability to specifically bind antigen. The term "domain" refers to a globular region of a heavy or light chain polypeptide comprising peptide loops (e.g., comprising 3 to 4 peptide loops) stabilized, for example, by β-pleated sheet and/or intrachain disulfide bond. Domains are further referred to herein as "constant" or "variable", based on the relative lack of sequence variation within the domains of various class members in the case of a "constant"

domain, or the significant variation within the domains of various class members in the case of a "variable" domain. Antibody or polypeptide "domains" are often referred to interchangeably in the art as antibody or polypeptide "regions". The "constant" domains of antibody light chains are referred to interchangeably as "light chain constant regions", "light chain constant domains", "CL" regions or "CL" domains. The "constant" domains of antibody heavy chains are referred to interchangeably as "heavy chain constant regions", "heavy chain constant domains", "CH" regions or "CH" domains. The "variable" domains of antibody light chains are referred to interchangeably as "light chain variable regions", "light chain variable domains", "VL" regions or "VL" domains. The "variable" domains of antibody heavy chains are referred to interchangeably as "heavy chain variable regions", "heavy chain variable domains", "VH" regions or "VH" domains.

Immunoglobulins or antibodies may be monoclonal or polyclonal and may exist in monomeric or polymeric form.

The term "IgM" or "Immunoglobulin M," refers to antibodies with a pentameric structure, e.g., the IgM antibodies found in blood serum. With a molecular weight of approximately 970 kDa, IgM antibodies are considerable larger than IgG that have a monomeric structure and a molecular weight of approximately 150 kDa. Unlike IgG antibodies that have 2 antigen binding sites, IgM antibodies have 10 antigen binding sites. IgM antibodies are primarily responsible for the agglutination of red blood cells when a recipient receives a blood transfusion from an incompatible donor. For instance, a person with blood type A and having anti-B IgM antibodies will experience agglutination upon transfusion from a blood type B donor. The large IgM antibodies can generally be separated from smaller IgG antibodies in blood plasma by fractionation.

In addition to removing anti-A and/or anti-B antibodies from a sample, the compositions described herein can also be used to obtain purified anti-A IgM antibody or purified anti-B antibody.

In some embodiments, anti-A IgM antibody or anti-B IgM antibody is isolated from a clarified cell culture expressing such an antibody, using blood group A antigen ligand media or blood group B antigen ligand media described herein, respectively. An exemplary process of purifying the IgM antibodies is as follows. A clarified cell culture expressing an IgM antibody in 10 mM PBS is flowed over a column containing the blood group A antigen ligand media or blood group B antigen ligand media. The column is subsequently washed with an aqueous buffer ranging at a pH ranging from 3.0-9.0. The anti-A IgM antibody or anti-B antibody bound to the column is eluted from the column with an acidic buffer ranging in pH from 2.0 to 3.0.

The media described herein can be used to obtain anti-A IgM or anti-B IgM antibody having a purity of at least 80%, or at least 90%, or at least 95% or greater than 95%, as determined by analytical size exclusion chromatography. In some embodiments, the purity of the IgM antibody is at least 95%, as determined by analytical size exclusion chromatography.

In some embodiments, the purified anti-A IgM antibody or anti-B IgM antibody is used as a model molecule to assess the quality of a chromatography media containing blood group A antigen ligand or blood group B antigen ligand, as described in co-pending patent application internal no. P15/176, filed on even date herewith.

The term "purify," or "purifying" or "purified" or "purity," as used herein, refer to refer to increasing the concentration of a target molecule in a sample comprising the target molecule and one or more impurities. Typically, the degree of purity of the target molecule is increased by removing (completely or partially) at least one impurity from the sample. In some embodiments, purity of a target molecule (e.g., IgM antibody in this case) is measured in "parts per million" or "ppm". In some embodiments, the units ppm refer to the amount of impurities (e.g., host cell proteins (HCPs) in nanograms/milligram per target molecule (e.g., monoclonal IgM) in milligrams/milliliter, where the target molecule and the HCPs are in solution. In some embodiments, the purity of a monoclonal IgM-A or IgM-B antibody is increased to at least 90%, or at least 95%, or at least 96%, or at least 97%, or at least 98%, or at least 99% or greater, using the compositions described herein.

The term "clarify" or clarification" or "clarified" as used herein, refers to a process for removing suspended particles and or colloids in a cell culture feed, thereby to reduce turbidity, of a target molecule containing solution (e.g., an IgM antibody containing cell culture feed), as typically measured in NTU (nephelometric turbidity units). Clarification can be achieved by a variety of means, including centrifugation or filtration. Centrifugation could be done in a batch or continuous mode, while filtration could be done in a normal flow (e.g. depth filtration) or tangential flow mode. In processes used in the industry today, centrifugation is typically followed by depth filters intended to remove insoluble impurities, which may not have been removed by centrifugation. Furthermore, methods for enhancing clarification efficiency can be used, e.g. precipitation. Precipitation of impurities can be performed by various means such as by flocculation, pH adjustment (acid precipitation), temperature shifts, phase change due to stimulus-responsive polymers or small molecules, or any combinations of these methods. In some embodiments described herein, clarification involves any one or more of centrifugation, filtration, depth filtration and precipitation.

The term "loading pH" refers to the pH of a sample containing anti-A and/or anti-B antibodies which is incubated with a chromatography media described herein. In some embodiments, pH of a sample incubated with a chromatography media described herein ranges from about 4.5 to about 9.0 for a media suitable for anti-A antibody removal and from about pH 4.0 to about 9.0 for a media suitable for anti-B antibody removal. It is expected that under these conditions, the amount of anti-A or anti-B antibodies in a sample is reduced by at least 50% relative to before contacting the sample with the media.

As used herein, the term "cleaning" refers to a step during a chromatography process, which entails removing trace levels of impurities left on an affinity chromatography column after use, e.g., column containing chromatography media described herein for removing anti-A and/or anti-B antibodies, in order to retain the performance and integrity of the column and the media contained therein. While the step of cleaning removes impurities from the column, it should ideally have a minimal impact on the performance of the column, as measured using binding capacity of the chromatography media. Most commercially available chromatography media are cleaned using either an acidic solution or an alkaline solution. However, most commercially available chromatography media are unstable under extremes of pH and therefore cannot be cleaned using both acidic and alkaline conditions. The chromatography media described herein can be cleaned using both acid and alkaline solutions. Examples of cleaning solutions include acid solutions such as 0.15 M phosphoric acid or 0.3% v/v hydrochloric acid.

As used herein, the term "cleaning-in-place" or "CIP" is a method of cleaning the interior surfaces of pipes, vessels, process equipment, filters and associated fittings, without disassembly. The benefit of using CIP is that the cleaning is faster, less labor intensive and more repeatable, and poses less of a chemical exposure risk to people. For a chromatography column, CIP refers to cleaning the chromatography media as well as the column body and end fittings without unpacking the column. Usually, a chromatography column cleaned after a run is immediately re-equilibrated for the next run.

As used herein, the term "campaign" refers to several rounds of individual purification processes, run one after another in order to process a desired quantity of sample. In case of removal of anti-A and/or anti-B antibodies from a sample, a campaign typically involves use of an affinity chromatography step to remove anti-A and/or anti-B antibodies along with one or more downstream steps, which may be used to arrive at a therapeutic composition, e.g., for injecting into a patient, or at a composition which has certain desirable components. Such downstream steps may vary from end user to end user, depending on the purpose of the campaign. Although, cleaning is routinely practiced between runs within the campaign, when a campaign is complete, chromatography columns are further sanitized for storage, as the columns are typically used again in the next campaign, which could be several days or weeks or months later.

The term "elution" refers to a step during a purification process, whereby a chromatography media described herein is contacted with an elution buffer to remove impurities (i.e., anti-A and/or anti-B) bound to the media. Examples of elution buffers include 0.1 M glycine, pH 2.0; 0.1 M glycine, pH 2.2; 0.1 M glycine, pH 2.5; 0.1 M glycine, pH 2.7; 0.1 M glycine, pH 3.0.

As used herein, the term "sanitization" or "sanitizing" or "sanitize" is the step used after the completion of a campaign and is designed to reduce the microbial population to a level considered safe or acceptable, as determined by the FDA or other regulatory agencies. Sanitization is typically achieved using heat or chemicals. A chromatography column which is to be stored until the next campaign is generally sanitized by chemical means due to the impracticality of heat sanitization. Most affinity chromatography columns are sanitized using up to 0.5 M NaOH. However, 0.5 M NaOH is also known to decrease the performance of chromatography media. In some embodiments described herein, a solution comprising phosphoric acid, acetic acid and benzyl alcohol (PAB) is used for sanitization. Surprisingly, the chromatography media described herein maintain their binding capacity or the ability to remove substantial amount of anti-A and/or anti-B antibodies even after sanitization with PAB.

The terms "anti-A" or "anti-A antibodies" refer to antibodies which bind blood group A antigens found on the surface of cells in individuals that have blood group type A or blood group type AB. Accordingly, it is desirable to remove such antibodies in blood derived samples (e.g., blood, blood products, plasma, plasma derivatives or an IVIG feed).

The terms "anti-B" or "anti-B antibodies" refer to antibodies which bind blood group B antigens found on the surface of cells in individuals that have blood group type B or blood group type AB. Accordingly, it is desirable to remove such antibodies in blood derived samples (e.g., blood, blood products, plasma, plasma derivatives or an IVIG feed).

II Exemplary Ligands

The compositions described herein are useful for removing anti-A or anti-B antibodies from a sample, e.g., blood, blood products, plasma, plasma derivatives or IVIG feed.

The compositions described herein include oligosaccharide based ligands attached to a suitable solid support.

Exemplary oligosaccharide based ligands are shown below. The abbreviations used in the structure are defined as follows: Gal=D-galactose, Fuc=L-fucose, GalNAc=N-acetyl-D-galactosamine, GlcNAc=N-acetyl-D-glucosamine, R=the linkage from the ligand to the solid support, although linkages at other positions on the ligand structure may also be used.

Examples of blood group type A antigen ligands include, but are not limited to, molecules that having the following structures: trisaccharide antigen A (GalNAc$\alpha$1,3[Fuc$\alpha$1,2]Gal$\beta$-R), tetrasaccharide antigen A Type 1 (GalNAc$\alpha$1,3[Fuc$\alpha$1,2]Gal$\beta$1,3GlcNAc$\beta$1-R), tetrasaccharide antigen A Type 2 (GalNAc$\alpha$1,3[Fuc$\alpha$1,2]Gal$\beta$1,4GlcNAc$\beta$1-R), tetrasaccharide antigen A Type 3 (GalNAc$\alpha$1,3[Fuc$\alpha$1,2]Gal$\beta$1,3GalNAc$\alpha$1-R), and tetrasaccharide antigen A Type 4 (GalNAc$\alpha$1,3[Fuc$\alpha$1,2]Gal$\beta$1,3GalNAc$\beta$1-R). In a particular embodiment, the ligand is trisaccharide antigen A (GalNAc$\alpha$1,3[Fuc$\alpha$1,2]Gal$\beta$-R), which is attached to a solid support.

Examples of blood group type B antigen ligands include molecules that having the following structures: trisaccharide antigen B (Gal$\alpha$1,3[Fuc$\alpha$1,2]Gal$\beta$-R), tetrasaccharide antigen B Type 1 (Gal$\alpha$1,3[Fuc$\alpha$1,2]Gal$\beta$1,3GlcNAc$\beta$1-R), tetrasaccharide antigen B Type 2 (Gal$\alpha$1,3[Fuc$\alpha$1,2]Gal$\beta$1,4GlcNAc$\beta$1-R), tetrasaccharide antigen B Type 3 (Gal$\alpha$1,3[Fuc$\alpha$1,2]Gal$\beta$1,3GalNAc$\alpha$1-R), and tetrasaccharide antigen B Type 4 (Gal$\alpha$1,3[Fuc$\alpha$1,2]Gal$\beta$1,3GalNAc$\beta$1-R). In a particular embodiment, the ligand is trisaccharide antigen B (Gal$\alpha$1,3[Fuc$\alpha$1,2]Gal$\beta$-R) attached to a solid support.

III. Exemplary Solid Supports

One or more of the above-mentioned ligands may be attached to a solid support at a ligand loading of at least 0.8 mg/ml of solid support, thereby resulting in a chromatography media which is suitable for removing blood group A and/or blood group B antigen antibodies.

Examples of solid supports include, but are not limited to, alumina, silica, celite, ceramics, metal oxides, porous glass, controlled pore glass, carbohydrate polymers, polysaccharides, agarose, sepharose, sephadex, dextran, cellulose, starch, chitin, zeolites, synthetic polymers, polyvinyl ether, polyethylene, polypropylene, polystyrene, nylons, polyacrylates, polymethacrylates, polyacrylamides, polymaleic anhydride, membranes, hollow fibers and fibers. In some embodiments, the solid support is a porous or non-porous polymeric solid support and comprises a polymer selected from the group consisting of polyvinylether, polyvinylalcohol, polymethacrylate, polyacrylate, polystyrene, polyacrylamide, polymethacrylamide and polycarbonate. In a particular embodiment, the solid support is a polyvinylether based solid support. In some embodiments, the solid support is in bead form (e.g., a polyvinyl ether based porous bead).

IV. Methods of Attaching Ligands to Solid Supports

It is possible to employ a myriad of functional groups to facilitate attachment of a ligand to a solid support. The non-limiting examples of such functional groups include amine, thiol, furan, maleimide, epoxy, aldehyde, alkene, alkyne, azide, azlactone, carboxyl, activated esters, triazine, and sulfonyl chloride. In a particular embodiment, an amine group is used as a functional group.

The solid support may also be modified and/or activated to include one or more functional groups mentioned above that facilitate immobilization of a suitable ligand or ligands to the support.

In a particular embodiment, the solid support is modified using the reductive amination chemistry, wherein the solid support is derivatized to offer an aldehyde group for ligand immobilization.

Such derivatization is achieved by first modifying the solid support (e.g., a polyvinyl ether based bead) to include epoxide groups, which is further hydrolyzed to produce a diol group. The diol group is subsequently reduced to an aldehyde group. The aldehyde containing solid support (for example, solid support at the aldehyde density of about or higher than 1 μmol/ml of solid support) is then subject to immobilization step at a desired ligand loading (e.g., at least 0.8 mg/ml) via reductive amination reaction between the aldehyde and amine groups.

In a particular embodiment, the solid support is modified using the polymeric tentacle chemistry, wherein the solid support is derivatized to include a carboxylic acid group for ligand immobilization step. Such derivatization is achieved by first polymerizing a suitable monomer (for example, acrylic acid, methacrylic acid, itaconic acid, tert-butyl acrylate, tert-butyl methacrylate) from the surface of the solid support (e.g., a polyvinyl ether based bead) using cerium-initiated polymerization method. The carboxylic acid containing solid support (for example, solid support at the carboxylic density of about or higher than 1 mol/ml of solid support) is then subject to immobilization step at a desired ligand loading (e.g., at least 0.8 mg/ml) via standard acid-amine coupling chemistry between carboxylic acid and amine groups. Ligand immobilization via activated carboxylic acid groups may also be applied directly from solid support surface without tentacle formation.

V. Assay for Measuring the Percentage Removal of Anti-A and Anti-B Antibodies

The chromatography media described herein are useful for removal of anti-A and/or anti-B antibodies from a sample (e.g., blood, blood products, plasma, plasma derivatives or IVIG feed).

The chromatography media described herein include a blood group A antigen ligand and/or blood group B antigen ligand attached to a solid support at a ligand loading of at least 0.8 mg/ml of the solid support, and offer greater flexibility in terms of range of operating conditions under which they may be used, cleaned and/or sanitized. Specifically, the chromatography media described herein exhibit stability under acid and alkaline conditions, even after exposure to such conditions for a prolonged period of time. Accordingly, the chromatography media described herein maintain their ability to remove anti-A and anti-B antibodies from a sample following exposure to acid or alkaline conditions.

In general, the percentage removal of anti-A or anti-B antibodies from a sample can be measured as follows. A sample containing the molecule is contacted with a suitable media under appropriate conditions and for a period of time suitable to facilitate binding of the molecule to the media. Thereafter, the molecule that is bound to the media is separated from the remaining sample solution and the concentration of the molecule in the remaining sample solution (i.e., concentration of unbound molecule) is measured. The concentration of the molecule in solution can be determined by several different methods known in the art. The concentration of anti-A and anti-B antibodies can be also be determined by agglutination assays that use red blood cells, flow-cytometry assays such as those based on fluorescence-activated cell sorting (FACS) of red blood cells, and enzyme-linked immunosorbent assay (ELISA) that use antigen based materials.

In the methods described herein, the ability of a chromatography media to remove anti-A and anti-B antibodies from a sample is measured with and without exposure to acid or alkaline conditions.

Embodiments are further illustrated by the following examples which should not be construed as limiting. The contents of all references, patents and published patent applications cited throughout this application, as well as the Figures, are incorporated herein by reference.

EXAMPLES

Example 1. Synthesis of Trisaccharide A Ligand Containing Media Using Reductive Amination (RA) Chemistry Blood group A antigen trisaccharide (TriA) ligand media were synthesized by immobilizing TriA ligands onto proprietary polyvinyl ether based porous solid support (in the form of beads) using reductive amination chemistry. The specific structures of the TriA and TriB ligands are shown FIGS. 1 and 2, respectively.

The ligands were linked to the hydroxyl groups on the solid support. 10 ml of settled beads were conditioned with isopropyl alcohol, and transferred into a reaction vessel. To the reaction vessel, 10 ml of isopropyl alcohol and 0.273 ml of 32% NaOH solution was added. The suspension was stirred for 30 minutes at room temperature, followed by addition of 1.22 ml of 1,4-butanediol diglycidyl ether (BUDGE) to the suspension. The suspension was stirred for 5 hours at room temperature. The suspension was washed using a filter assembly 3× with water. The wet beads were transferred back to the reaction vessel. 11.8 ml of water and 0.26 ml of glacial acetic acid were added and suspension was stirred for another 30 minutes at room temperature. The beads were then washed 3× with water, and transferred back to the reaction vessel.

17 ml of 0.5 M sulfuric acid was added to the beads, and the suspension was stirred for 2 hours at 75° C. The beads were washed several times to adjust the pH of suspension between 4 and 5. The solution was sucked out using filter assembly and the wet beads were transferred back the reaction vessel. To the reaction vessel, 10 ml of 2.5% sodium metaperiodate was added, and the suspension was stirred for 2.5 hours at room temperature. Finally, the beads were washed 5× with water to result in aldehyde-modified polyvinyl ether base beads suitable for coupling with the ligand A or B.

10 ml aldehyde-modified wet base beads were transferred to a reaction vessel. To this vessel, 16.5 mg of trisaccharide A, 10 ml of 0.1 M $NaHCO_3$ and 150 mg of sodium cyanoborohydride was added. The suspension was stirred at room temperature for 16 hours. 400 mg of glycine was added to the reaction vessel and the suspension was further stirred for at least 2 hours at room temperature. The resulting TriA ligand containing chromatography media was washed 5× with water and 3× with Tris buffer at pH=8. The media was further washed with 3× with 0.05 M acetic acid solution and 3× with water, and was finally stored in 20% ethanol solution.

The media was subsequently evaluated for ability to remove anti-A antibodies from an IVIG feed, with and without exposure to acid or alkaline conditions, as described below in subsequent examples.

Example 2. Synthesis of Trisaccharide B Ligand Containing Chromatography Media by Reductive Amination (RA) Chemistry The trisaccharide B ligand containing media was prepared similarly to the trisaccharide A ligand containing media, as described above. The 10 ml aldehyde-modified wet base beads, as prepared above, were transferred to a reaction vessel. To this vessel, 12.0 mg of trisaccharide B, 10 ml of 0.1 M $NaHCO_3$ and 150 mg of sodium cyanoborohydride was added. The suspension was stirred at room temperature for 16 hours. 400 mg of glycine was added to the reaction vessel and the suspension was further stirred for at least 2 hours at room temperature. The resulting Tri B ligand containing chromatography media was washed 5× with water and 3× with Tris buffer at pH=8. The media was further washed 3× with 0.05 M acetic acid solution and 3× with water, and was finally stored in 20% ethanol solution.

The media was subsequently evaluated for its ability to remove anti-B antibodies from an IVIG feed, with and without exposure to acid or alkaline conditions, as described below in subsequent examples.

Example 3. Synthesis of Trisaccharide A or B Containing Media Using the Polyacrylic Acid (pAA) Tentacle Chemistry In this representative example, a different chemistry, i.e., pAA tentacle approach, was used for attaching trisaccharide A or B ligands to a polyvinyl ether based beads.

Figure 1:
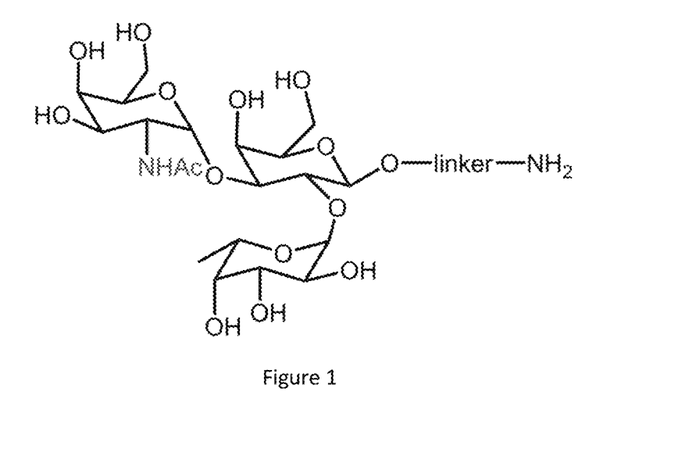
FIG. 1 is a representative oligosaccharide ligand, which binds anti-A antigen antibodies.
Figure 2:
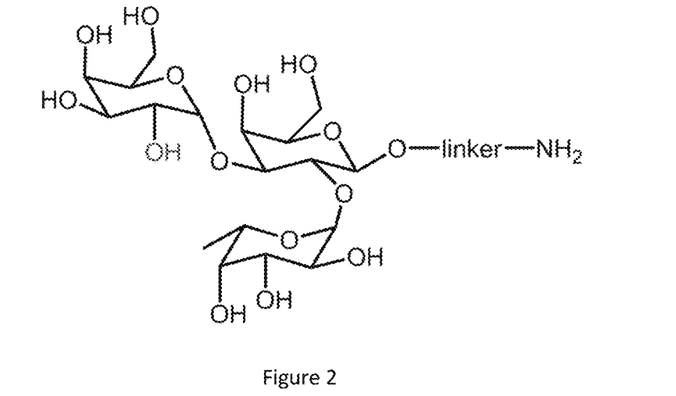
FIG. 2 is a representative oligosaccharide ligand, which binds anti-B antigen antibodies.

Blood group A and B antigen ligands (trisaccharide A and B) as shown in FIGS. 1 and 2, were linked to the polyvinyl ether based beads with hydroxyl groups, in two separate reactions, one for attaching trisaccharide A ligand to beads and another for attaching trisaccharide B ligand to beads. In the first step of synthesis, beads were modified to include carboxylic groups for reacting with amine groups of the ligands shown in FIGS. 1 and 2.

10 ml of settled beads were conditioned with water, and transferred into a reaction vessel. Two solutions, namely "monomer solution" and "initiator solution", were prepared as follows. 10 ml of monomer solution was prepared by mixing 0.137 ml of acrylic acid, 0.1 ml of 65% nitric acid solution and 9.763 ml of water, and 10 ml of initiator solution was prepared by mixing 0.33 gm of cerium ammonium nitrate, 0.1 ml of 65% nitric acid solution and 9.1 ml of water. The monomer solution was added to the reaction vessel containing wet beads. The suspension and initiator solution were purged with nitrogen gas for approximately 15 minutes. The initiator solution was then transferred to the reaction vessel, and the suspension was stirred for 4 hours at 40° C. under nitrogen atmosphere. The beads were washed 7× with water, 10× with a solution of 0.2 M ascorbic acid and 1M sulfuric acid, 5× with water, 2× with PBS buffer and finally, 3× with water.

10 ml of pAA-modified wet beads were transferred to two separate reaction vessels. To one vessel, 16.5 mg of trisaccharide A, 10 ml of 0.01 M $NaHCO_3$ and 0.1 gm of 1-ethyl-3-(3-(dimethylamino)propyl)-carbodiimide hydrochloride (EDC) was added. To the other vessel, 12.0 mg of trisaccharide B, 10 ml of 0.01 M $NaHCO_3$ and 0.1 gm of EDC was added. Both suspensions were stirred at 32° C. for 16 hours. The resulting chromatography media were washed 3× with 0.01 M $NaHCO_3$ and 3× with water, and the wash solutions were sucked off using filter assembly. The media was again transferred back to the reaction vessels and 5% v/v solution of ethanolamine in 0.01 M $NaHCO_3$ was added to each vessel. The suspensions were stirred for 16 hours at room temperature, and the media were washed 5× with water. Finally, the media were stored in 20% ethanol.

The media containing either trisaccharide A ligand or B ligand, made using the pAA tentacle approach described above, were subsequently evaluated for removal of anti-A or anti-B antibodies, respectively, from an IVIG feed, with and without exposure to acid or alkaline conditions, as described below in subsequent examples.

Example 4. Effect of Feed Loading pH on Anti-A or Anti-B Antibody Removal

The removal of anti-A or anti-B antibodies using the media described herein was demonstrated at sample conditions ranging from pH 3.5 to pH 9.0. A sample (a representative IVIG feed) containing anti-A or anti-B antibodies was dialyzed into buffers having different pH values ranging from 3.5 to 9.0. Media samples made using different attachment chemistries were subsequently contacted with the feed materials having varying pH values.

The chromatography media made using either the RA approach or the pAA tentacle approach, described above, were subsequently evaluated for removal of anti-A or anti-B antibodies from the various feed materials, as described below.

Blood group A or B antigen antibody (anti-AB) levels were determined using an established flow cytometry method (Christensson, M. et al, Transfusion, 1996; 36:500-505). Type A or Type B red blood cells were incubated with a representative IVIG feed for a pre-determined time, followed by extensive washes. The cells were then stained with fluorescence-labeled anti-human IgGs, and subjected to Flow Cytometry (Guava 5HT, EMD Millipore). Net mean fluorescence intensity (MFI) values were used to compare the levels of anti-A or anti-B polyclonal antibodies in the IVIG feed before and after contacting with a media containing either trisaccharide A ligand or a trisaccharide B ligand. Percentage removal of anti-A or anti-B antibodies was calculated by comparing the level of such antibodies in the resulting flow through (or supernatant) to the level in the starting feed material.

The following table summarizes the percent removal of the anti-A or anti-B antibodies at each feed loading pH condition for two different IVIG feed materials.

For both feed materials, a trend was observed where higher pH levels offered greater removal of anti-A and anti-B antibodies. It was observed that pH levels of 4.5 and higher provided anti-A removal levels of greater than 65 percent. For pH levels of 4.0 and higher, anti-B removal levels were greater than 65 percent. At even higher pH levels, pH 5.0-9.0, the percent removals were near 90 percent for anti-A and anti-B removal, thereby demonstrating that such media are effective under wide range of loading pH and also work best under higher loading pH (e.g., pH 5 to 9).

TABLE 1

Percent removal of anti-A or anti-B antibodies at different feed loading pH values

| Feed loading pH | Feed #1: % anti-A removal | Feed #1: % anti-B removal | Feed #2: % anti-A removal | Feed #2: % anti-B removal |
|---|---|---|---|---|
| 3.5 | 34 | 53 | 44 | 39 |
| 4.0 | 44 | 67 | 56 | 71 |
| 4.5 | 70 | 91 | 66 | 86 |
| 5.0 | 81 | 89 | 84 | 90 |
| 5.5 | 86 | 92 | 89 | 93 |
| 7.5 | 89 | 94 | 91 | 93 |
| 9.0 | 89 | 90 | 87 | 89 |

Example 5. Evaluating the Stability of Media Following Exposure to PAB

In this Example, the stability of the different chromatography media prepared herein was evaluated following exposure to PAB (120 mM phosphoric acid, 167 mM acetic acid, 2.2% benzyl alcohol), which is typically used for sanitization of chromatography materials.

with fluorescence-labeled anti-human IgGs, and subjected to Flow Cytometry (Guava 5HT, EMD Millipore). Net mean fluorescence intensity (MFI) values were used to compare the levels of anti-A or anti-B polyclonal antibodies in the feed material before and after incubating with a media containing either trisaccharide A ligand or a trisaccharide B ligand. Percentage removal of anti-A or anti-B antibodies was calculated by comparing the level of such antibodies in the resulting flow through (or supernatant) to the starting level in the feed material.

As observed herein, the chromatography media containing trisaccharide A or trisaccharide B ligand maintain their ability to remove anti-A and anti-B antibodies, respectively, after exposure to PAB. No significant change in anti-A or anti-B removal capabilities was observed relative to a control sample which was not exposed to PAB (indicated by "0 hours" of PAB exposure in the table below). For Feed 1, about 80% or higher of anti-A or anti-B antibodies were removed both in case of control and following exposure to PAB. For Feed 2, about 90% of anti-A or anti-B was removed both in case of control and following exposure to PAB.

TABLE 2

Percent removal of anti-A or anti-B antibody removal before and after PAB exposure at two ligand loading levels

| PAB Exposure Time | Ligand Loading (gm/ml) | Feed #1: % anti-A removal | Feed #2: % anti-A removal | Feed #1: % anti-B removal | Feed #2: % anti-B removal |
|---|---|---|---|---|---|
| 0 hours | TriA-1.65 or TriB-1.20 | 79 | 90 | 80 | 92 |
| 0 hours | TriA-2.80 or TriB-2.1 | 82 | 90 | 76 | 92 |
| 50 hours | TriA-1.65 or TriB-1.20 | 80 | 91 | 82 | 93 |
| 50 hours | TriA-2.80 or TriB-2.1 | 81 | 92 | 84 | 91 |
| 150 hours | TriA-1.65 or TriB-1.20 | 83 | 91 | 81 | 90 |
| 150 hours | TriA-2.80 or TriB-2.1 | 81 | 92 | 82 | 93 |

Media with two different ligand loading levels, as shown in Table 2, were evaluated for removal of anti-A and anti-B from two different IVIG feed samples.

The stability of the chromatography media was demonstrated by exposing the media containing trisaccharide A or trisaccharide B ligand to PAB for extended periods of time, i.e., at least 50 or at least 150 hours and then evaluating their ability to remove anti-A or anti-B antibodies from an IVIG feed, as described below.

As observed, both trisaccharide A and B ligand containing media, made using either RA approach or the pAA tentacle approach, exhibited stability following exposure to PAB, i.e., ability to remove anti-A or anti-B antibodies from an IVIG feed.

Stability of the media was measured by evaluating their ability to remove anti-A or anti-B antibodies from an IVIG feed, as described below.

Specifically, blood group A or B antigen antibody (anti-AB) levels were determined using an established flow cytometry method (Christensson, M. et al, TRANSFUSION 1996; 36:500-505). Type A or Type B red blood cells were incubated with the feed material for a pre-determined time, followed by extensive washes. The cells were then stained

Example 6. The Trisaccharide A and Trisaccharide B Ligand Containing Media are Stable Under Acidic Conditions The trisaccharide A and B ligand containing media described herein, were demonstrated to exhibit chemical stability following exposure to a variety of acids and low pH buffer solutions, e.g., 0.1 M glycine buffer pH 2.0; 0.1 M glycine buffer pH 2.2; 0.1 M glycine buffer pH 2.5; 0.1 M glycine buffer pH 2.7; and 0.1 M glycine buffer pH 3.0.

The acid stability was demonstrated by exposing the different media to acidic conditions for a specified period of time, e.g., at least 50 hours, and then evaluating the media for their ability to remove anti-A and anti-B from two feed materials. A control sample which was not exposed to any acid was also evaluated for anti-A and anti-B removal capabilities.

As observed herein, the trisaccharide A and B ligand containing media maintained their ability to remove anti-A or anti-B antibodies, respectively, even after prolonged exposure to acidic conditions. The samples which had been exposed to the acid solutions maintained their ability to remove about 80 percent or greater of anti-A and anti-B from both feed materials.

TABLE 3

Percent removal of anti-A or anti-B antibodies following acid exposure

| Acid Exposure Condition | Feed #1: % anti-A removal | Feed #1: % anti-B removal | Feed #2: % anti-A removal | Feed #2: % anti-B removal |
|---|---|---|---|---|
| Control (No Acid Exposure) | 79 | 80 | 90 | 92 |
| Citric acid, pH 2.7 | 87 | 90 | 87 | 81 |
| Acetic acid, pH 2.8 | 86 | 91 | 86 | 92 |
| Glycine, pH 2.2 | 87 | 90 | 86 | 93 |
| Glycine, pH 2.5 | 89 | 91 | 88 | 93 |
| Glycine, pH 2.7 | 89 | 92 | 86 | 94 |
| Glycine, pH 3.0 | 88 | 92 | 86 | 87 |

It was further demonstrated that the trisaccharide A and trisaccharide B ligand containing media maintain the ability to bind and purify IgM-A and IgM-B antibodies, respectively, following sanitization under acidic conditions.

The trisaccharide A and B ligand containing media described herein, were evaluated for their stability under acidic or low pH conditions, e. g., PAB. This was demonstrated by exposing the media to PAB for specific periods of time, e. g., at least 50 hours or 150 hours, and then evaluating the IgM-A and IgM-B binding capacity. A control sample that had not been exposed to PAB was used as a basis to calculate retained binding capacity by using the equation below.

$$\text{Retained Capacity}(\%) = 100 \times \frac{\text{Binding Capacity}_{t=0 \text{ hours}} - \text{Binding Capacity}_{t=t \text{ hours}}}{\text{Binding Capacity}_{t=0 \text{ hours}}}$$

Table 4 below demonstrates the retained IgM-A and IgM-B binding capacity of trisaccharide A and trisaccharide B ligand containing media after exposure to acidic conditions.

TABLE 4

| PAB Exposure Time (hours) | Retained IgM-A Binding Capacity (%) | Retained IgM-B Binding Capacity (%) |
|---|---|---|
| 50 | 96 | 100 |
| 150 | 95 | 95 |

Example 7. The Trisaccharide A and Trisaccharide B Ligand Containing Media are Stable Under Alkaline Conditions The trisaccharide A and B ligand containing media described herein, were evaluated for their stability under alkaline or high pH conditions, e.g., 0.5 M NaOH. This was demonstrated by exposing the media to 0.5 M NaOH for specified periods of time, e.g., at least 50 hours or 150 hours, and then evaluating the anti-A and anti-B removal capabilities of the media from two different IVIG feed materials. A control sample that had not been exposed to NaOH was also evaluated for anti-A and anti-B removal capabilities.

As observed herein, the trisaccharide A and B ligand containing media maintained their ability to remove anti-A and anti-B antibodies, respectively, even after prolonged exposure to alkaline conditions. Even after 150 hours of exposure to NaOH, the media were capable of removing about 75 percent of anti-A and about 88 percent of anti-B.

TABLE 5

Percent removal of anti-A and anti-B antibodies after exposure to 0.5M NaOH

| NaOH Exposure Time | Feed #1: % anti-A removal | Feed #1: % anti-B removal | Feed #2: % anti-A removal | Feed #2: % anti-B removal |
|---|---|---|---|---|
| 0 hours | 91 | 90 | 84 | 87 |
| 50 hours | 86 | 88 | 82 | 87 |
| 150 hours | 75 | 88 | 77 | 90 |

In a further experiment, trisaccharide A and trisaccharide B ligand containing media was shown to maintain the ability to bind and purify IgM-A and IgM-B antibodies, respectively, following sanitization under alkaline conditions.

The trisaccharide A and B ligand containing media described herein, were evaluated for their stability under alkaline or high pH conditions, e. g., 0.5 M NaOH. This was demonstrated by exposing the media to 0.5 M NaOH for specific periods of time, e. g., at least 50 hours or 150 hours, and then evaluating the IgM-A and IgM-B binding capacity. A control sample that had not been exposed to NaOH was used as a basis to calculate retained binding capacity by the equation shown in the Example above.

Retained IgM-A and IgM-B binding capacity of trisaccharide A and trisaccharide B ligand containing media after exposure to alkaline conditions is shown in Table 6 below.

TABLE 6

| NaOH Exposure Time (hours) | Retained IgM-A Binding Capacity (%) | Retained IgM-B Binding Capacity (%) |
|---|---|---|
| 50 | 94 | 100 |
| 150 | 92 | 97 |

Example 8. Effect of Ligand Loading on Removal of Anti-A Antibodies

The effect of ligand loading on the percent removal of anti-A and anti-B antibodies by the chromatography media described herein was determined as follows.

The trisaccharide A or trisaccharide B media having different ligand loadings were incubated with a representative IVIG feed and the anti-A antibody removal was determined using flow cytometry assay, described previously herein.

The results are shown in the table below. It was found that as trisaccharide A ligand loading increases, the % removal of anti-A antibodies increased for the range of ligand loading tested. For pAA tentacle chemistry, higher than 70% removal of anti-A antibodies was obtained at ligand loadings of 1.65 mg/ml or more, and higher than 80% removal was obtained at ligand loadings of 2.1 mg/ml. In comparison, for RA chemistry, higher than 80% removal of anti-A antibodies was obtained at ligand loadings of 1.2 mg/ml or more.

This result was rather unexpected, as previously, it has been reported that having a lower ligand density (which would mean a lower ligand loading) would be desirable to have for such media to work effectively (see, publication no. WO2015/001277).

TABLE 7

Effect of ligand loading on percent anti-A removal for two separate media samples

| Ligand loading (g/lit) | % anti-A removal (pAA chemistry) | % anti-A removal (RA chemistry) |
| --- | --- | --- |
| 1.2 | 74 | 81 |
| 1.5 | NA | 83 |
| 1.65 | 78 | NA |
| 2.1 | 80 | 82 |
| 2.8 | 82 | NA |
| 3.5 | 85 | 83 |
| 4.2 | 87 | 84 |

Example 9. Effect of Ligand Loading on Removal of Anti-B Antibodies

The effect of ligand loading on the ability of a TriB ligand containing chromatography media described herein to remove anti-B antibodies from a representative IVIG feed was investigated.

The effect of this ligand loading was demonstrated by incubating feed with media samples containing different ligand loadings and then measuring the anti-B removal using flow cytometry assay, as previously described herein. The results are shown in the table below. It was observed that as trisaccharide B ligand loading increases, the % removal of anti-B antibodies increased for the range of ligand loading tested.

For pAA tentacle chemistry approach, higher than 70% removal of anti-B antibodies was obtained at ligand loadings of 1.2 mg/ml or more, and higher than 80% removal was obtained at ligand loadings of 1.65 mg/ml, and higher than 90% removal was obtained at ligand loadings of 2.8 mg/ml or more. In comparison, for RA chemistry, higher than 90% removal of anti-B antibodies was obtained at ligand loadings of 1.2 mg/ml or more.

As discussed above, this result was rather unexpected as previously, it has been reported that having a lower ligand density (which would mean a lower ligand loading) would be desirable to have for such media to work effectively (see, publication no. WO2015/001277).

TABLE 8

Effect of ligands loading on percent removal of anti-B antibodies

| Ligand Loading (g/lit) | % anti-B Removal (pAA chemistry) | % anti-B Removal (RA chemistry) |
| --- | --- | --- |
| 1.2 | 78 | 91 |
| 1.65 | 88 | 93 |
| 2.1 | 87 | 92 |
| 2.8 | 91 | 93 |
| 3.5 | 92 | 91 |

Example 10. Sequential Removal of Anti-A and Anti-B Antibodies from a Sample

The chromatography media described herein can be used sequentially for the removal of both anti-A and anti-B antibodies from a sample. In other words, a chromatography media for removal of anti-A antibodies can be used first followed by a chromatography media for removal of anti-B antibodies, Alternatively, a chromatography media for removal if anti-B antibodies can be used first, followed by a chromatography media for removing anti-A antibodies.

In this experiment, an IVIG feed material was first passed through a column containing a trisaccharide A ligand containing chromatography media followed by a separate column containing a trisaccharide B ligand chromatography media. The removal of anti-A and anti-B antibodies was determined using flow cytometry. The opposite order was also demonstrated, where the feed was contacted with chromatography media containing a trisaccharide B ligand first, followed by a chromatography media containing a trisaccharide A ligand.

The table below shows the total percent of anti-A and anti-B antibodies removed from the feed using these approaches. At least 87 percent of the anti-A antibody was removed after passing the feed material through both media. At least 92 percent of the anti-B was removed after passing the feed material through both media.

TABLE 9

Percent Removal of anti-A and anti-B antibodies following sequential use of two different chromatography media

| Process Train | % anti-A Removal | % anti-B Removal |
| --- | --- | --- |
| trisaccharide A → trisaccharide B | 87 | 95 |
| trisaccharide B → trisaccharide A | 91 | 92 |

Example 11. Purification of Murine Monoclonal IgM-A Antibody

The compositions described herein can be used to purify a monoclonal IgM antibody from a clarified cell culture feed expressing an IgM antibody. This experiment describes the purification of an IgM-A antibody from a clarified cell culture feed. In some embodiments, a purified IgM-A molecule is used as a model molecule to assess the quality of a chromatography media containing blood group A antigen ligand, as described in U.S. Provisional Patent Application No. 62/215,401, filed on Sep. 8, 2015.

Blood group A antigen murine monoclonal IgM antibody (anti-A) was purified from commercially available clarified cell culture feed containing the anti-A IgM produced from the clone BIRMA-1 (Vox Sang., 1991, 61: 53-58) that was dialyzed into 10 mM PBS buffer (product number: JH-1L-BK, EMD Millipore, Billerica, Mass., USA). The anti-A cell culture feed was filtered through a 0.22 micron membrane and subjected to bind/elute chromatography on a media having blood group A antigen trisaccharide (TriA) ligands attached thereto, as described herein.

A column 10 mm in diameter was packed to 64 mm with the Tri-A ligand media. The column was equilibrated with 10 mM PBS buffer (10 column volumes (CVs) at 305.58 cm/h, 4.0 mL/min) and subsequently loaded with the clarified cell culture feed containing anti-A in 10 mM PBS (40 CVs, 229.18 cm/h, 3.0 mL/min). The column was washed with 10 mM PBS buffer (5 CVs, 305.58 cm/h, 4.0 mL/min), followed by 0.5 M sodium chloride in 10 mM PBS buffer (10 CVs, 305.58 cm/h, 4.0 mL/min). Then, the anti-A IgM antibody was eluted from the column with 0.1 M glycine at pH 2.7 (9 CVs, 305.58 cm/h, 4.0 mL/min). The column was subsequently washed with 10 mM PBS buffer (10 CVs, 305.58 cm/h, 4.0 mL/min) and stripped with 0.5 M sodium hydroxide (10 CVs, 305.58 cm/h, 4.0 mL/min) before further runs.

1 mL of 2.0 M Tris base was added to 45 mL of the anti-A IgM eluate to increase its solution pH to 6-7. The elution was subsequently dialyzed into 10 mM PBS using dialysis tubing (Standard RC Dialysis Trial Kits, Spectra/Por® 1-3, 3.5K MWCO, 54 mm FLAT WIDTH, serial number: 132725, Spectrum Laboratories, Inc. Rancho Dominguez, Calif., 90220 USA). After dialysis in 10 mM PBS, the resulting solution of the monoclonal anti-A IgM was found to have a concentration of approximately 1.1 mg/mL based on an extinction coefficient of 1.50 at 280 nm, as determined based on the IgM antibody's amino acid composition. The monoclonal anti-A IgM antibody was found to be 97% pure as determined by analytical size exclusion chromatography.

Example 12. Purification of Monoclonal Murine IgM-B Antibody

Blood group B antigen murine monoclonal IgM antibody (anti-B) was purified from commercially available clarified cell culture feed containing the anti-B IgM produced from the clone LB-2 that was dialyzed into 10 mM PBS buffer (product number: JM-1L-BK, EMD Millipore, Billerica, Mass., USA). The anti-B cell culture feed was filtered through a 0.22 micron membrane and subjected to bind/elute chromatography on a media having blood group antigen trisaccharide (TriB) ligands attached thereto, as described herein.

A column 10 mm in diameter was packed to 64 mm with the TriB ligand media. The column was equilibrated with 10 mM PBS buffer (10 CVs at 305.58 cm/h, 4.0 mL/min) and subsequently loaded with the clarified cell culture feed containing monoclonal anti-B in 10 mM PBS (40 CVs, 229.18 cm/h, 3.0 mL/min). The column was washed with 10 mM PBS buffer (5 CVs, 305.58 cm/h, 4.0 mL/min, followed by with 0.5 M sodium chloride in 10 mM PBS buffer (10 CV, 305.58 cm/h, 4.0 mL/min). Then the anti-B antibody was eluted from the column with 0.1 M glycine at pH 2.7 (9 CVs, 305.58 cm/h, 4.0 mL/min). The column was subsequently washed with 10 mM PBS buffer (10 CVs, 305.58 cm/h, 4.0 mL/min) and stripped with 0.5 M sodium hydroxide (10 CVs, 305.58 cm/h, 4.0 mL/min) before further runs.

1 mL of 2.0 M Tris base was added to 45 mL of the anti-B eluate to increase its solution pH to 6-7. The elution was dialyzed into 10 mM PBS using dialysis tubing (Standard RC Dialysis Trial Kits, Spectra/Por® 1-3, 3.5K MWCO, 54 mm FLAT WIDTH, serial number: 132725, Spectrum Laboratories, Inc. Rancho Dominguez, Calif., 90220 USA). After dialysis in 10 mM PBS, the resulting solution of the monoclonal anti-B murine IgM had a concentration of approximately 1.3 mg/mL based on an extinction coefficient of 1.44 at 280 nm, as determined based on the protein's amino acid composition. The monoclonal anti-A IgM antibody was found to be 98% pure as determined by analytical size exclusion chromatography.

The specification is most thoroughly understood in light of the teachings of the references cited within the specification which are hereby incorporated by reference. The embodiments within the specification provide an illustration of embodiments and should not be construed as limiting in scope. The skilled artisan (practitioner) readily recognizes that many other embodiments are encompassed by this disclosure. All publications and reference materials are incorporated by reference in their entirety. To the extent that the material incorporated by reference contradicts or is inconsistent with the present specification, the present specification will supercede any such material. The citation of any references herein is not an admission that such references are prior art.

Unless otherwise indicated, all numbers expressing quantities of ingredients, cell culture, treatment conditions, and so forth used in the specification, including claims, are to be understood as being modified in all instances by the term "about." Accordingly, unless otherwise indicated to the contrary, the numerical parameters are approximations and may vary depending upon the desired properties sought to be obtained by the embodiments disclosed herein. Unless otherwise indicated, the term "at least" preceding a series of elements is to be understood to refer to every element in the series. Those skilled in the art will recognize, or be able to ascertain using no more than routine experimentation, many equivalents to the specific embodiments described herein. Such equivalents are intended to be encompassed by the following claims.

Many modifications and variations of the embodiments disclosed herein can be made without departing from its spirit and scope, as will be apparent to those skilled in the art. The specific embodiments described herein are offered by way of example only and are not meant to be limiting in any way. It is intended that the specification and examples be considered as exemplary only, with a true scope and spirit of the disclosure being indicated by the following claims.

What is claimed is:

1. A method of removing anti-B antibodies from a sample, the method comprising the steps of:
   (a) providing a sample comprising an amount of anti-B antibodies; incubating the sample with a media for removing anti-B antibodies from a sample, the media comprising a solid support with a blood group B antigen oligosaccharide based ligand attached thereto, wherein the oligosaccharide based ligand is attached to the solid support at a ligand loading of at least 0.8 mg/ml of solid support, wherein the blood group B antigen ligand has the following structure:

and wherein the media is stable under acid and alkaline conditions and wherein the solid support comprises a polyvinyl ether polymer and the blood group B antigen oligosaccharide based ligands are attached via pAA tentacle chemistry to a solid support, for the media to bind blood group B antibodies;

(b) recovering portion of the sample which is not bound to the media; and

(c) measuring amount of anti-B antibodies in the portion of the sample in (b), wherein the amount of anti-B antibodies in (c) is at least 80% less than the amount of anti-B antibodies in the sample in (a), wherein the media can be readily eluted and cleaned in place multiple times under a wide range of pH conditions, without losing its capability to remove the anti-B antibodies from the sample.

2. The method according to claim 1, wherein the ligand loading of the media is at least 1 mg/ml of solid support or at least 1.2 mg/ml of solid support.

3. The method of claim 1, wherein the media is packed in a device.

4. The method of claim 3, wherein the device is a chromatography column.

5. A method of purifying a monoclonal anti-B IgM antibody from a clarified cell culture feed, the method comprising the steps of:
(a) providing a clarified cell culture feed containing a monoclonal anti-B IgM antibody;
    incubating the feed with a media for removing anti-B antibodies from a sample, the media comprising a solid support with a blood group B antigen oligosaccharide based ligand attached thereto, wherein the oligosaccharide based ligand is attached to the solid support at a ligand loading of at least 0.8 mg/ml of solid support, wherein the blood group B antigen ligand has the following structure:

(b) and wherein the media is stable under acid and alkaline conditions and wherein the solid support comprises a polyvinyl ether polymer and the blood group B antigen oligosaccharide based ligands are attached via pAA tentacle chemistry to a solid support to facilitate the binding of anti-B IgM antibody to the media;

(c) washing the media with an aqueous buffer having a pH ranging from 3.5 to 9.0, wherein the media can be readily eluted and cleaned in place multiple times without losing its capability to remove the anti-B IgM antibodies from the sample;

(d) eluting the anti-B IgM antibody from the media using a buffer having a pH ranging from 2.0 to 3.0, thereby to obtain an eluate; and (e) recovering the purified anti-B IgM antibody in the eluate.

6. The method of claim 5, wherein the media are packed in a chromatography column.

7. The method of claim 6, wherein the clarified cell culture feed is flowed through the column.

* * * * *